United States Patent [19]

Cingone

[11] Patent Number: 4,727,654
[45] Date of Patent: Mar. 1, 1988

[54] LENS PATTERN BLANK

[75] Inventor: James Cingone, Hempstead, N.Y.

[73] Assignee: James Industries Co., Hempstead, N.Y.

[21] Appl. No.: 937,656

[22] Filed: Dec. 4, 1986

Related U.S. Application Data

[63] Continuation-in-part of Ser. No. 798,037, Nov. 14, 1985, Pat. No. 4,656,754.

[51] Int. Cl.⁴ .............................................. A61B 3/10
[52] U.S. Cl. .................................... 33/507; 33/200
[58] Field of Search .................................. 33/200, 507

[56] References Cited

U.S. PATENT DOCUMENTS

| | | | |
|---|---|---|---|
| 1,520,445 | 12/1924 | Rushmer | 33/507 |
| 1,648,500 | 11/1927 | Newell et al. | 33/507 |
| 1,790,572 | 1/1931 | Bugbee | 33/507 |
| 2,190,582 | 2/1940 | Wolf | 33/507 X |
| 2,413,198 | 12/1946 | Stewart | 33/507 |
| 3,313,031 | 4/1967 | Lowe | 33/507 |
| 4,244,639 | 1/1981 | Kanda | 33/200 |
| 4,299,032 | 11/1981 | Young | 33/507 |
| 4,656,754 | 4/1987 | Cingone | 33/507 |

Primary Examiner—William D. Martin, Jr.
Attorney, Agent, or Firm—Sprung Horn Kramer & Woods

[57] ABSTRACT

A lens pattern blank has an axis scale pattern on the front face thereof to enable the user to check the axis of the pattern before cutting lenses, particular for bifocal lenses. The axis scale pattern includes a mark along the X axis and to the left of the origin on the front face of the blank and a range of angles with a 0 point at the X axis and a radial center at the cross. The angular markings are disposed to the right of the origin.

6 Claims, 7 Drawing Figures

LENS PATTERN BLANK

This application is a continuation-in-part application of U.S. application Ser. No. 798,037 filed Nov. 14, 1985, and now U.S. Pat. No. 4,656,754.

BACKGROUND OF THE INVENTION

The present invention relates to a lens pattern blank for use in shaping lenses for fitting into eyeglass frames and the like.

Lens pattern blanks are known in the art and are typified by the prior art blank 1 shown in FIGS. 1 and 2. Blanks of this type, although shown in one particular shape, can be square, rectangular or circular. These blanks are generally formed from high impact styrene plastic and have two planar faces 2, 3 and a mounting hub 4 including mounting holes 5–7 which are used to mount the blank on a lens cutting or edging machine.

Conventional blanks include a centering grid pattern thereon including X and Y axes 8, 9 also include distance indicia 10 thereon to enable the blank to be centered in the lens opening of a frame. This blank is used by the optician or optical lab technician to cut a pattern for a particular frame to be able to cut a round lens to the proper shape to be fit into the frame.

When a pattern is cut manually or mechanically, the most important data that must be supplied to the optician or lab technician is the effective diameter of the pattern which is twice the largest radius from the geometric center and the angle of that radius. This enables the optician to choose a smaller and therefore less expensive lens blank for the prescription.

Conventionally, the length of the longest radius has been obtained by making measurements on the pattern after it has been cut. The grid on the face of the blank is used to center the eyeglass frame over the lens blank when the pattern is being drawn thereon.

Moreover, the axis of the pattern blank must be correct when bifocals are made, otherwise the resulting lenses will be ruined.

SUMMARY OF THE INVENTION

The object of the present invention is to simplify the checking of the axis of a pattern before the lenses are cut.

These and other objects of the present invention are achieved in accordance with the present invention by providing a scale pattern on the front face of the pattern blanks. The scale comprises a cross aligned with the center line of the mounting holes and to the side thereof and in angular scale at the other side of the mounting holes and centered at the center line of the holes.

The axis scale is a simple but very useful feature which allows one to check the axis of the pattern before the lenses are cut. One no longer has to ruin a pair of expensive bifocals to know if the axis is correct.

To use the axis scale, one simply inserts the cut pattern blank into an eyeglass frame. The eye or eyewire of the frame is disposed perpendicular to the workbench. The temples should extend over the edge of the workbench (not on the bench) so as not to interfere with the frame front being perpendicular to the bench. One then simply aligns the points of a surface gauge with the cross on the left side of the biank. Then one moves the gauge to the right side of the blank where the +5° to −5° scale is located. Any deviation in the axis can now be read directly from the axis grid and the user can now compensate for that deviation before edging any lenses.

These and other features and advantages of the present invention will become more apparent from a detailed description of the invention taken with the attached drawings, wherein:

DETAILED DESCRIPTION OF THE INVENTION

Figure 1:
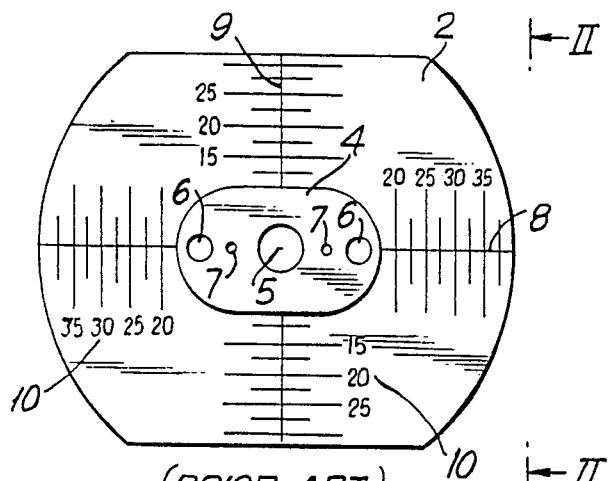
FIG. 1 is a front view of a prior art blank.
Figure 2:
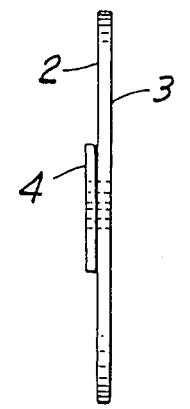
FIG. 2 is a side view of FIG. 1.
Figure 3:
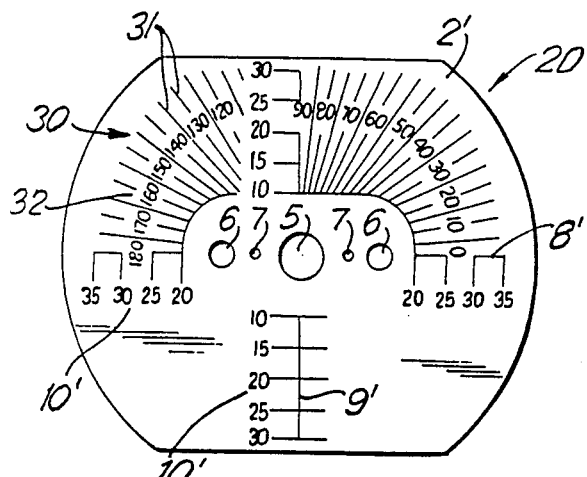
FIG. 3 is a front view of a blank in accordance with the present invention.
Figure 4:
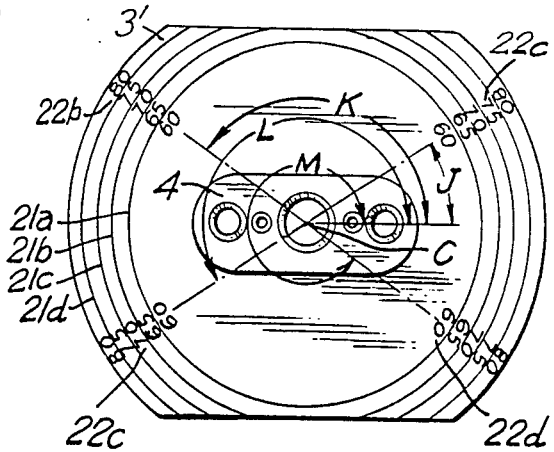
FIG. 4 is a front view of the rear of the blank of FIG. 3.

The lens pattern blank 20, as shown in FIGS. 3–4, has a front face 2' and a rear face 3' at which the mounting hub 4 is disposed. The mounting hub 4 also includes the holes 5–7 and the hole 5 having the center point C. Face 2' includes the centering X-Y grid 8', 9' and indicia 10' thereon.

FIG. 3 shows the protractor pattern 30 on face 2' which includes a plurality of angle lines 31 and angle indicia 32 which runs from 0° to 180°.

On face 3' are provided a plurality of concentric circles 21a–21d each of which has the common center C. Associated with circles 21a–21d are four sets of diameter indicia 22a–22d which are disposed at substantially equal angular intervals. The indicia are provided within each circle for reasons that will become evident hereinafter. The indicia 22a–22d are also preferably provided so that indicia 22a is at an angle of J of 30°–40° preferably 35°, indicia 22b is at an angle K of 120°–130°, preferably 125°, indicia 22c is at an angle L of 210°–220°, preferably 215° and indicia 22d at an angle M of 300°–310°, preferably 305°.

Figure 6:
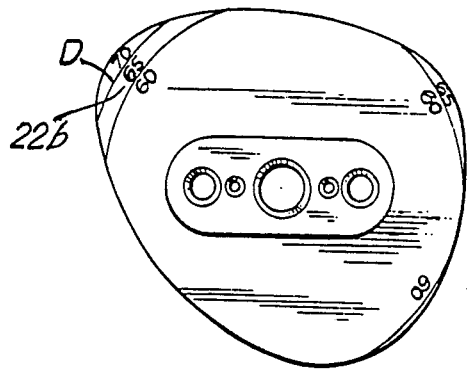
FIG. 6 shows the blank of FIG. 4 after it has been cut.

The reason for this is that most long points occur in the 30°–40° range and thus when the lens pattern blank is cut as shown in FIG. 6, the diameter indicia will almost be evident for the longest radii.

Figure 5:
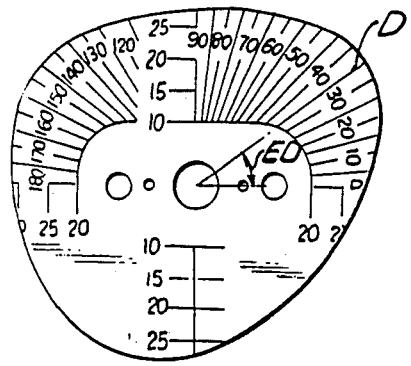
FIG. 5 shows the blank of FIG. 3 after it has been cut.

As can be seen from FIGS. 5 and 6, after the pattern blank is cut, the angle ED of the longest radii is immediately apparent from the protractor pattern 30 on face 2' and the effective diameter D for a lens blank to be used will become immediately apparent from indicia 22b wherein the highest number 70 indicates that the lens blank that must be used to produce the lens has to have a diameter of 70 mm. Because the diameter indicia is placed within the circle, the highest remaining number left on face 3' after the lens pattern blank has been cut, will immediately indicate the effective diameter of the lens that must be used for the particular frame.

It is apparent to one skilled in the art that the concentric circles and the protractor pattern can be placed on either of the two faces in any combination independent of the placement of the mounting hub. It is also apparent that while four sets of diameter indicia have been used, more or less can be used in the scope of the present invention.

It is also apparent that the present invention will work equally well with other shape pattern blanks including square, rectangular and circular blanks. It can be seen that the outermost concentric circle in FIG. 4 can be the outer periphery of the lens blank itself when the pattern has a circular periphery.

Figure 7:
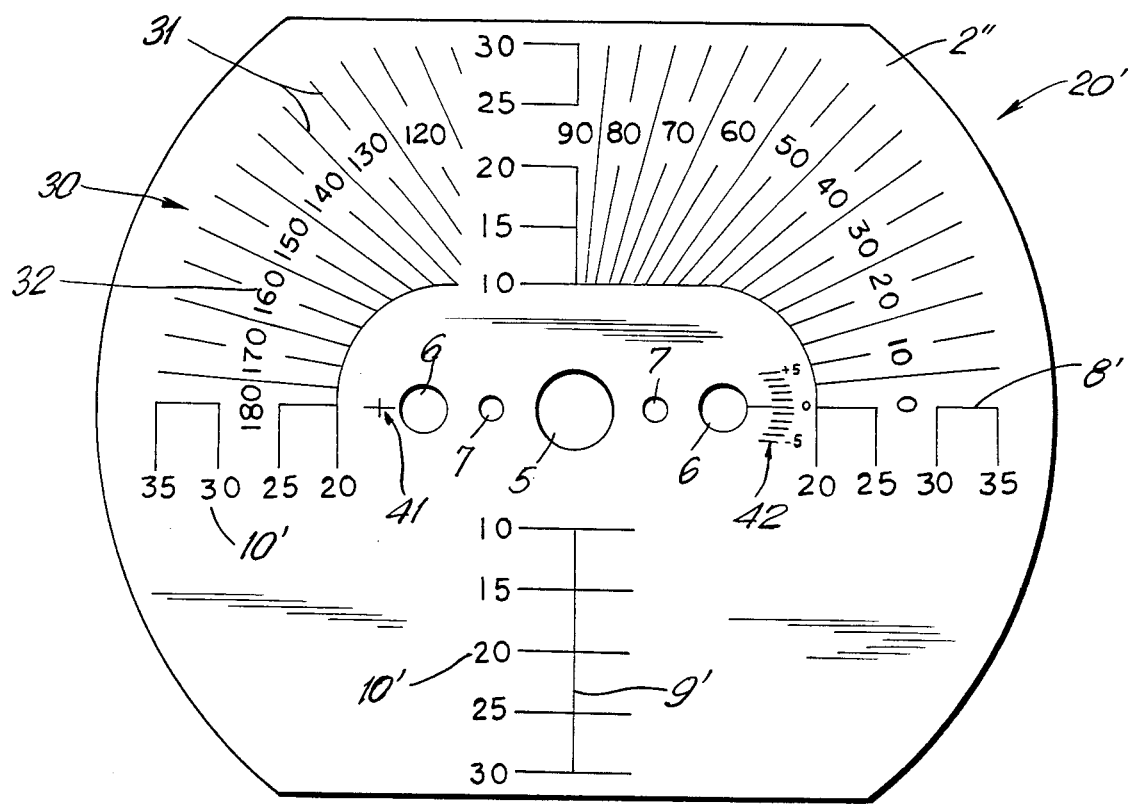
FIG. 7 shows a front view of another blank in accordance with the invention.

FIG. 7 shows the front face 2" of a lens blank 20' including an axis scale which comprises a cross 41 aligned with the center lines of mounting holes 5-7 and to the left thereof and angle scale 42 having its "0" line along the center line of holes 5-7 and its radial center at cross 41.

To use the axis scale, simply insert the cut pattern blank 20' into an eyeglass frame (not shown). The eye or eyewire is held perpendicular to the users workbench and the temples should extend over the edge of the workbench (not on the bench) so as not to interfere with the eye frame front being perpendicular to the bench. One then aligns the pointer of a conventional surface gauge with the cross 41 on the left side of the blank. Then the gauge is moved to the right side of the blank where the +5 to −5 scale 42 is located. Any deviation of the axis can now be read directly from the scale 42 and can now be compensated for that deviation before edging any lenses.

It will be appreciated that the instant specification and claims are set forth by way of illustration and not limitation, and that various modifications and changes may be made without departing from the spirit and scope of the present invention.

What is claimed is:

1. In a lens pattern blank having two planar faces, a mounting hub on one face, a circular mounting hole passing through the faces and the hub and a first grid pattern on the other face and having the origin of the axes thereof coincident with the center of the mounting hole, the improvement comprising: an axis scale pattern on said other face including a first mark along one axis of the first grid pattern and spaced apart from the origin on one side of the other axis and angular markings with a zero degree line coincident with said one axis and having the radial center at said mark, wherein the angular markings are spaced apart from the origin on the other side of said other axis.

2. The lens pattern blank according to claim 1, wherein the angular markings range from +5 to −5 degrees.

3. The lens pattern blank according to claim 1, wherein the first mark comprises a cross.

4. The lens pattern blank according to claim 1, wherein the mark is along the X-axis of the first grid pattern.

5. The lens pattern blank according to claim 2, wherein the first mark comprises a cross.

6. The lens pattern blank according to claim 5, wherein the mark is along the X-axis of the first grid pattern.

* * * * *